J. R. COUSINS
CLEVIS.
APPLICATION FILED FEB. 28, 1908.
916,847.
Patented Mar. 30, 1909.
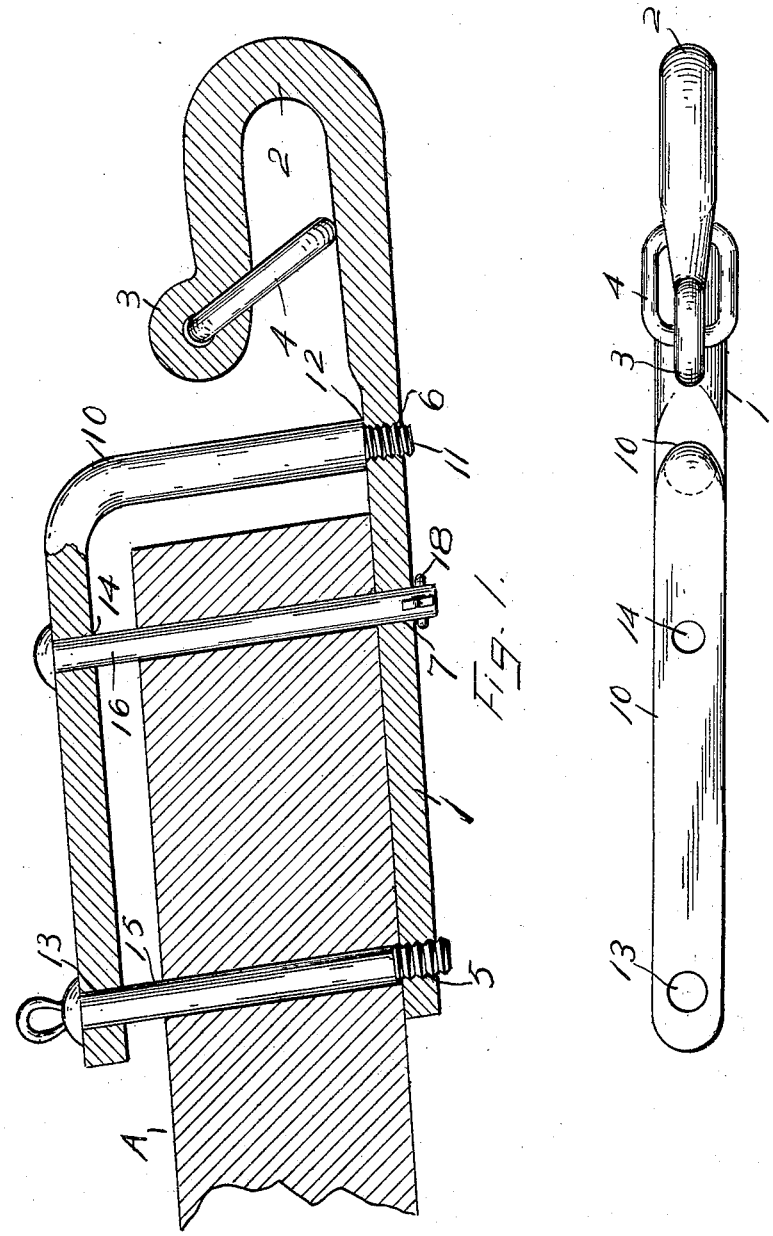
Inventor
John R. Cousins.

UNITED STATES PATENT OFFICE.

JOHN R. COUSINS, OF BURKEVILLE, TEXAS.

CLEVIS.

No. 916,847.      Specification of Letters Patent.      Patented March 30, 1909.

Application filed February 28, 1908. Serial No. 418,271.

*To all whom it may concern:*

Be it known that I, JOHN R. COUSINS, a citizen of the United States, residing at Burkeville, in the county of Newton, State of Texas, have invented certain new and useful Improvements in Clevises; and I do hereby declare the following to be a full, clear, and exact description of the invention, such as will enable others skilled in the art to which it appertains to make and use the same.

This invention relates to certain new and useful improvements in clevises.

The object of the present invention is to provide as an article of manufacture a clevis which will not only be strong and durable, but will cost very little to make and which may be easily and quickly connected to the end of a vehicle tongue.

In the accompanying drawings, Figure 1 shows an elevation of the clevis embodying my invention, with portions broken away, with the forward end of a plow beam being shown in section, and Fig. 2 shows a top view of my clevis.

In order to provide a clevis that may be quickly adjusted to plow beams of different thickness, I employ a J-shaped draft hook 1 having the recurved end 2 the termination 3 of which is perforated and held within this perforation or eye is a drop link 4, the lower end of this drop link resting upon the upper surface of the draft-hook. Near the rear end this hook is provided with the threaded perforation 5 and midway with the threaded perforation 6, a pin opening 7 being positioned between the threaded openings 5 and 6. In connection with this draft hook 1 I use an L-shaped bar 10 having the threaded end 11, a shoulder 12 being provided at this threaded end, as is shown in Fig. 1. This bar is provided at its end with the bolt opening 13, and midlength with the pin opening 14. The bar in question is secured to the draft hook by threading the same into the opening 6. Held within the bolt opening 13 and threading into the opening 5 is the bolt 15, while removably held within the pin openings 7 and 14 is a draft pin 16, this pin at its lower end being perforated to receive an ordinary cotter pin 18.

In Fig. 1 the forward end of a plow beam A is shown in section disclosing the manner of securing a clevis to the same, said end being formed with a pair of vertical openings which aline with the perforations 5 and 7 formed in the draft hook 1, and the perforations 13 and 14 in the crank bar 10, the clevis, as a whole, being disposed longitudinally of the tongue.

My construction method permits the clevis being quickly adjusted to beams of different thicknesses.

While I have described my clevis as secured to a plow beam, it is of course understood that the same may be attached to other kinds of farm implements. In the construction as shown the bolt 16 is the primary draft member, the function of the pin 15 being more particularly intended to hold the clevis in place. The drop link 4 is intended to hold any double or swingle-tree connection securely to the clevis.

And having thus described my said invention, what I claim and desire to secure by U. S. Letters Patent is—

1. The combination, with a vehicle tongue formed at its outer end with a pair of vertical openings; of a clevis comprising a flat bar arranged longitudinally of the tongue and disposed against the under face thereof, said bar being formed at its forward end with a hook and rearwardly of said hook with three perforations, the rear and central perforations registering with the openings in the tongue, an L-shaped bar having one arm thereof disposed above and parallel with said tongue and formed with a pair of perforations alining with the openings in the latter, and its other arm fitted at its free end in the foremost perforation in the first named bar, and a pair of headed members extending through the perforations in the first named arm of the L-shaped bar, the openings in the tongue and the perforations in the first-named bar, for attaching the clevis to the tongue.

2. The combination, with a vehicle tongue formed at its outer end with a pair of vertical openings; of a clevis comprising a flat bar arranged longitudinally of the tongue and disposed against the under face thereof, said bar being formed at its forward end with a hook and rearwardly of said hook with three perforations, the foremost perforation and one of the two remaining perforations being threaded, said two remaining perforations registering with the openings in the tongue, an L-shaped bar having one arm thereof disposed above and parallel with said tongue and formed with a pair of perforations alining with the openings in the latter, and its other arm provided at its free end with a reduced threaded portion fitted in the foremost perforation in the first-named bar, and a pair of headed members extending through the perforations in the first-named arm, the openings in the tongue, and the perforations in the first-named bar, for attaching the clevis to the tongue, said members having their heads arranged to rest against said first-named arm, one of said members having a threaded end fitted in the other threaded perforation in said first-named bar.

In testimony whereof, I affix my signature, in presence of two witnesses.

JOHN R. COUSINS.

Witnesses:
C. C. WIGHTMAN,
F. R. McMAHM.